United States Patent
Jankovic et al.

(10) Patent No.: US 9,181,904 B2
(45) Date of Patent: Nov. 10, 2015

(54) METHOD AND SYSTEM FOR EXHAUST GAS RECIRCULATION CONTROL

(75) Inventors: Mrdjan J. Jankovic, Birmingham, MI (US); Julie Helen Buckland, Commerce Township, MI (US); Amey Y. Karnik, Dearborn, MI (US); Daniel Joseph Styles, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 779 days.

(21) Appl. No.: 12/854,067

(22) Filed: Aug. 10, 2010

(65) Prior Publication Data

US 2012/0037134 A1 Feb. 16, 2012

(51) Int. Cl.
*F02M 25/07* (2006.01)
*F02D 41/00* (2006.01)
*F02D 41/14* (2006.01)

(52) U.S. Cl.
CPC ....... *F02M 25/0709* (2013.01); *F02D 41/0002* (2013.01); *F02D 41/0072* (2013.01); *F02D 41/144* (2013.01); *F02M 25/0754* (2013.01); *F02D 2041/0017* (2013.01); *F02D 2041/1431* (2013.01); *F02D 2041/1432* (2013.01); *Y02T 10/42* (2013.01); *Y02T 10/47* (2013.01)

(58) Field of Classification Search
CPC ........... F02M 25/0709; F02M 25/0754; F02D 41/144; F02D 41/0072; F02D 41/0002; F02D 2041/1432; F02D 2041/1431; F02D 2041/0017; Y02T 10/42; Y02T 10/47

USPC .......... 123/703, 568.21, 568.22, 568.11, 698; 60/605.1, 2, 605.2, 278, 279, 280; 701/108, 109

See application file for complete search history.

(56) References Cited

U.S. PATENT DOCUMENTS

| | | | |
|---|---|---|---|
| 5,201,303 A | | 4/1993 | Kojima |
| 5,934,263 A | * | 8/1999 | Russ et al. ................. 123/698 |
| 6,000,385 A | | 12/1999 | Fukuma |
| 6,142,119 A | * | 11/2000 | Abe et al. .................. 123/435 |
| 6,705,276 B1 | * | 3/2004 | Sun et al. ................... 123/295 |
| 6,820,599 B2 | * | 11/2004 | Kurtz et al. ............. 123/568.21 |
| 6,857,263 B2 | * | 2/2005 | Gray et al. ................... 60/278 |
| 6,863,058 B2 | * | 3/2005 | Kurtz et al. ................ 123/672 |
| 6,899,090 B2 | * | 5/2005 | Arnold .................. 123/568.12 |

(Continued)

FOREIGN PATENT DOCUMENTS

WO 2008/149212 A1 12/2008

OTHER PUBLICATIONS

Magner, Stephen William et al., "Delay Compensated Air/Fuel Control of an Internal Combustion Engine of a Vehicle," U.S. Appl. No. 12/759,958, filed Apr. 14, 2010, 36 pages.

(Continued)

*Primary Examiner* — Hieu T Vo
*Assistant Examiner* — Sherman Manley
(74) *Attorney, Agent, or Firm* — Julia Voutyras; Alleman Hall McCoy Russell & Tuttle LLP (57) ABSTRACT

Methods and systems are provided for adjusting an EGR valve and one or more intake throttles responsive to the output of an intake oxygen sensor to provide a desired amount of EGR flow while maintaining engine torque. The adjustments are coordinated to improve distributed control of the EGR valves and intake throttles, and enable EGR flow even when one actuator is limited.

20 Claims, 5 Drawing Sheets

(56) References Cited

U.S. PATENT DOCUMENTS

| | | | |
|---|---|---|---|
| 6,968,689 B2 * | 11/2005 | Bleile et al. | 60/612 |
| 6,973,786 B1 * | 12/2005 | Liu et al. | 60/605.2 |
| 7,047,741 B2 * | 5/2006 | Gray, Jr. | 60/603 |
| 7,047,933 B2 * | 5/2006 | Gray, Jr. | 123/305 |
| 7,150,264 B2 * | 12/2006 | Kobayashi et al. | 123/376 |
| 7,267,117 B2 | 9/2007 | Tonetti et al. | |
| 7,281,368 B2 * | 10/2007 | Miyake et al. | 60/285 |
| 7,380,400 B2 * | 6/2008 | Barbe et al. | 60/605.2 |
| 7,383,118 B2 * | 6/2008 | Imai et al. | 701/104 |
| 7,620,490 B2 * | 11/2009 | Matsunaga | 701/108 |
| 8,020,538 B2 * | 9/2011 | Surnilla et al. | 123/568.12 |
| 8,103,428 B2 * | 1/2012 | Russ et al. | 701/108 |
| 8,104,457 B2 * | 1/2012 | Ide et al. | 123/568.18 |
| 8,230,675 B2 * | 7/2012 | Pursifull et al. | 60/278 |
| 8,306,720 B2 * | 11/2012 | Yamazaki et al. | 701/103 |
| 2002/0139360 A1 * | 10/2002 | Sato et al. | 123/698 |
| 2005/0193978 A1 * | 9/2005 | Ishikawa | 123/399 |
| 2005/0274369 A1 * | 12/2005 | Tonetti et al. | 123/704 |
| 2007/0079614 A1 | 4/2007 | Barbe et al. | |
| 2009/0293851 A1 * | 12/2009 | Bleile et al. | 123/568.26 |
| 2010/0101226 A1 * | 4/2010 | Shutty et al. | 60/602 |
| 2010/0179745 A1 * | 7/2010 | Nakayama et al. | 701/108 |
| 2011/0184632 A1 * | 7/2011 | Kang et al. | 701/109 |
| 2013/0247883 A1 * | 9/2013 | Onishi et al. | 123/568.11 |
| 2014/0202435 A1 * | 7/2014 | Hilditch et al. | 123/568.21 |
| 2014/0251285 A1 * | 9/2014 | Surnilla et al. | 123/520 |

OTHER PUBLICATIONS

Partial Translation of Office Action of Chinese Application No. 201110211972.1, Issued Feb. 27, 2015, State Intellectual Property Office of PRC, 8 Pages.

* cited by examiner

METHOD AND SYSTEM FOR EXHAUST GAS RECIRCULATION CONTROL

FIELD

The present application relates to methods and systems for controlling exhaust gas recirculation in an engine system.

BACKGROUND AND SUMMARY

In an effort to meet stringent federal government emissions standards, Engine systems may be configured with exhaust gas recirculation (EGR) systems wherein at least a portion of the exhaust gas is recirculated to the engine intake. Such EGR systems enable reduction in exhaust emissions while also improving fuel economy. Various sensors may be included in the engine system to estimate the EGR flow and control an amount of EGR delivered to the engine intake.

One example of such an EGR system is illustrated by Tonetti et al. in U.S. Pat. No. 7,267,117. Herein, an oxygen sensor is included in the engine air intake, and based on the output of the oxygen sensor, a controller is configured to adjust the position of an EGR valve to thereby provide a desired amount of EGR.

However, the inventors herein have recognized potential issues with such a system. Due to the distributed position of EGR valves and throttles in engine systems such as the engine system of Tonetti, EGR valve adjustments made in response to the output of the oxygen sensor may be relatively slow leading to a delay in providing the desired EGR flow. EGR valve adjustments may also cause transient changes in torque that may need to be compensated for. Delays and insufficiencies in EGR flow may lead to degraded engine performance and engine emissions.

Thus, in one example, some of the above issues may be at least partly addressed by a method of operating an engine including an EGR passage and an oxygen sensor. In one embodiment, the method may comprise, adjusting an EGR valve and a first intake throttle responsive to an output of the oxygen sensor to provide a desired EGR amount. The method may further comprise, adjusting a second intake throttle responsive to the output of the oxygen sensor to maintain a desired torque.

In one example, a vehicle engine may be a boosted engine including a turbocharger coupled between the engine intake and the engine exhaust. Further, the boosted engine may include an EGR passage to enable exhaust gas recirculation (EGR). In one example, the EGR passage may be a low-pressure (LP-EGR) passage configured to divert a portion of exhaust gas from the engine exhaust, downstream of a turbocharger turbine, to the engine intake, upstream of a turbocharger compressor. An EGR valve may be included in the EGR passage, upstream of the compressor, for adjusting an amount of EGR flow diverted through the EGR passage to the engine intake. A first air intake throttle, positioned in an air intake passage of the engine intake, upstream of the compressor, may be adjusted in concert with the EGR valve to adjust an amount of fresh air that is used to dilute exhaust gas from the EGR passage. By adjusting the EGR valve and the first air intake throttle, fresh air may be mixed with exhaust gas from the EGR passage at a mixing point in the intake passage, upstream of the compressor, to provide a desired EGR dilution and desired EGR flow.

The percent dilution of the EGR flow, at and beyond the mixing point, may be inferred from the output of an oxygen sensor positioned in the engine intake gas stream, downstream of the mixing point of the EGR valve and the first intake throttle, and upstream of a second main intake throttle. An engine controller may be configured to estimate a percent dilution based on feedback from the oxygen sensor output using a model that accounts for delays in dilution propagation of EGR flow from the mixing point to the engine intake point. For example, the model may compensate for relatively long delays between EGR valve (and first throttle) actuation and observed changes in dilution concentration at the oxygen sensor.

Thus, based on the oxygen sensor output voltage, an amount of EGR available (flow rate, amount, dilution, etc.) may be determined. Based on engine operating conditions, an amount of EGR desired may also be determined. The engine controller may then adjust the EGR valve and the first air intake throttle responsive to the output of the oxygen sensor, for example, based on feedback information regarding the available amount of EGR, inferred from the oxygen sensor output, and feed-forward information regarding the position of the EGR valve and the first intake throttle, to provide the desired amount of EGR. In one example, the adjustment may include, in response to the oxygen sensor output indicating EGR dilution is higher than a threshold, closing the EGR valve to provide less burned exhaust gas in the EGR, while opening the first air intake throttle to increase the amount of fresh air dilution of EGR. The adjustments of the EGR valve may be coordinated, for example, simultaneously or sequentially, with the adjustments of the first air intake throttle. In one example, as the EGR valve is opened, the first air intake throttle may be simultaneously proportionally closed. In another example, the first air intake throttle may start closing only after the EGR valve has crossed a threshold position. In still other examples, the adjustments may be modified based on positional limits of the EGR valve and the first intake throttle. For example, when the EGR valve is limited, or is in a non-linear region of operation, the desired EGR flow may be largely controlled by the first air intake throttle, and when the first air intake throttle is limited, or in a non-linear region of operation, the desired EGR flow may be largely controlled by the EGR valve. In this way, by adjusting both the EGR valve and the first air intake throttle in response to the output of the oxygen sensor, a faster and more precise EGR flow control may be obtained.

Further still, the adjustments of the EGR valve and the first air intake throttle may be coordinated with adjustments of a second main intake throttle, positioned downstream of the first air intake throttle, to reduce transient torque disturbances resulting from the EGR valve and first intake throttle adjustments. Specifically, the second main intake throttle may be adjusted responsive to the output of the oxygen sensor to maintain a desired engine torque. In one example, the adjustment of the second main intake throttle may follow the adjustment of the EGR valve and the first air intake throttle by a delay time to compensate for propagation delays.

In this way, EGR valve and first air intake throttle adjustments may be coordinated to provide the desired amount of EGR rapidly and accurately, while main intake throttle adjustments may be used to provide the desired torque even during the EGR valve and first air intake throttle adjustments. Further, the control and coordination of the distributed valves and throttles may be improved. By using adjustments to both an EGR valve and an first air intake throttle to provide the desired EGR flow, EGR flow adjustments may be possible even when one of the actuators is limited, or is within a non-linear region of operation. Additionally, by using the output of a single oxygen sensor to perform all the adjustments, the use of multiple sensors (such as air-flow sensors, exhaust air-fuel ratio sensors, pressure sensors etc.) in determining EGR dilution may be reduced, thereby providing component and cost reduction benefits, without degrading system precision.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
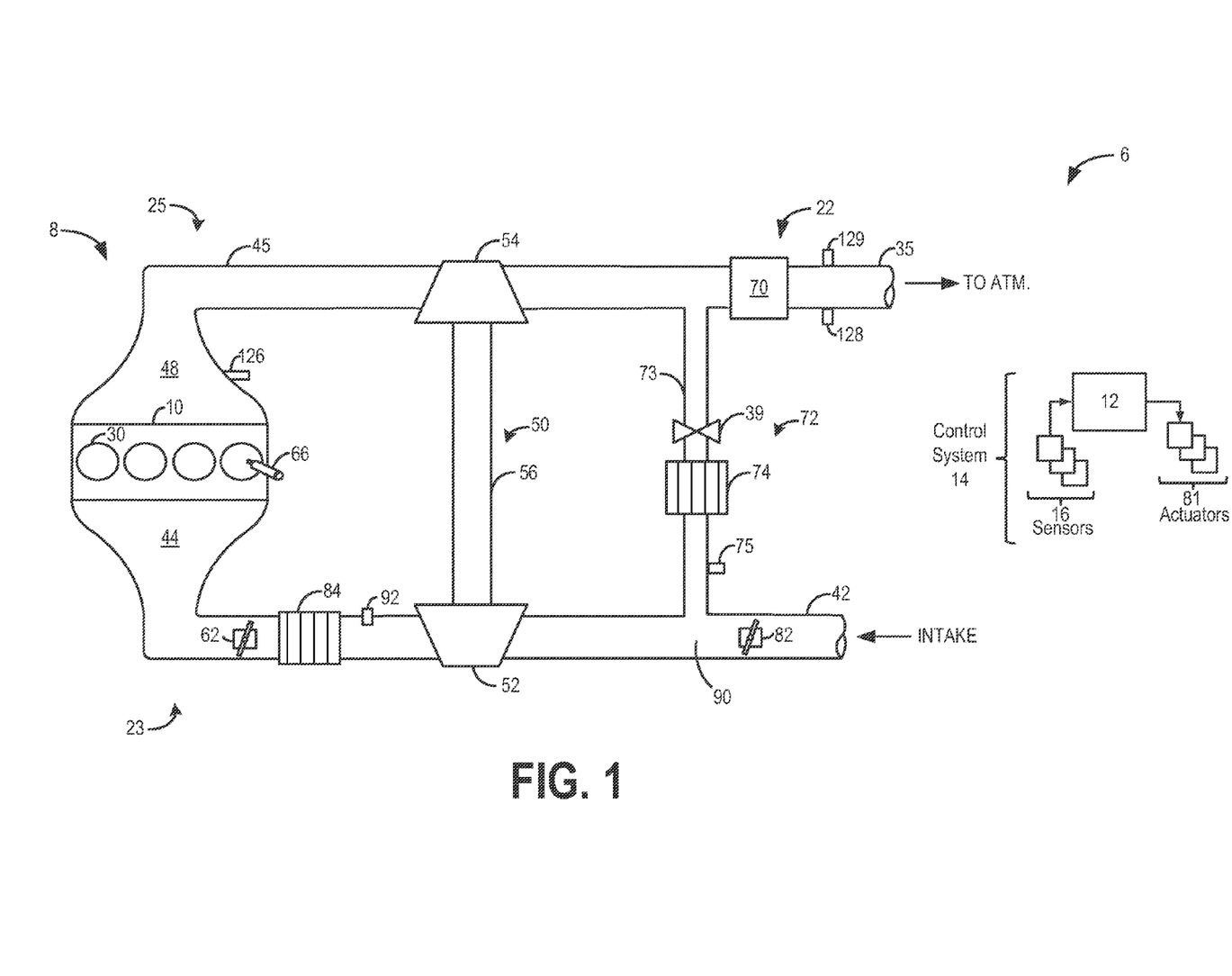
FIG. 1 shows a schematic depiction of an engine and an associated exhaust gas recirculation system.
Figure 2:
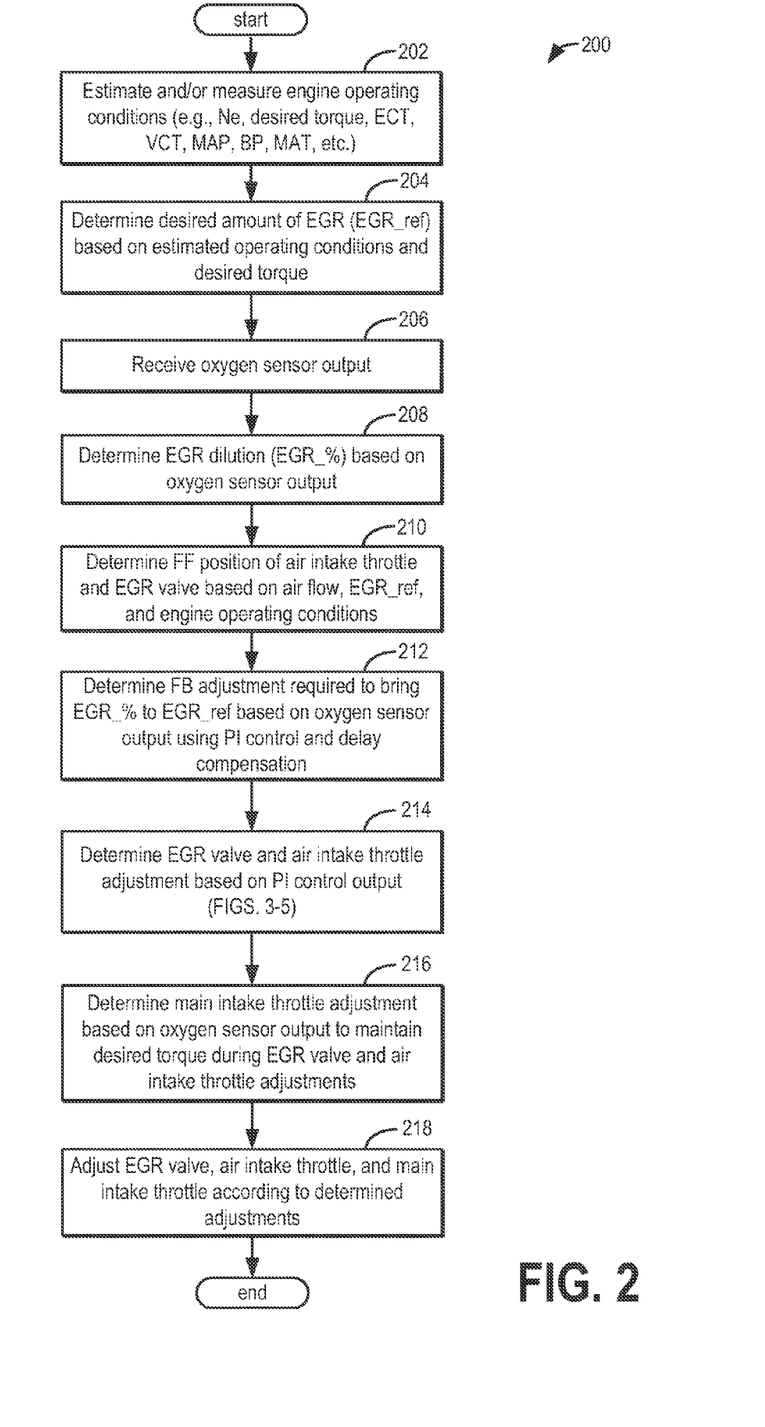
FIG. 2 shows a high level flow chart illustrating a routine that may be implemented for performing EGR valve and first intake throttle adjustments responsive to the output of an intake oxygen sensor, according to the present disclosure.
Figure 3:
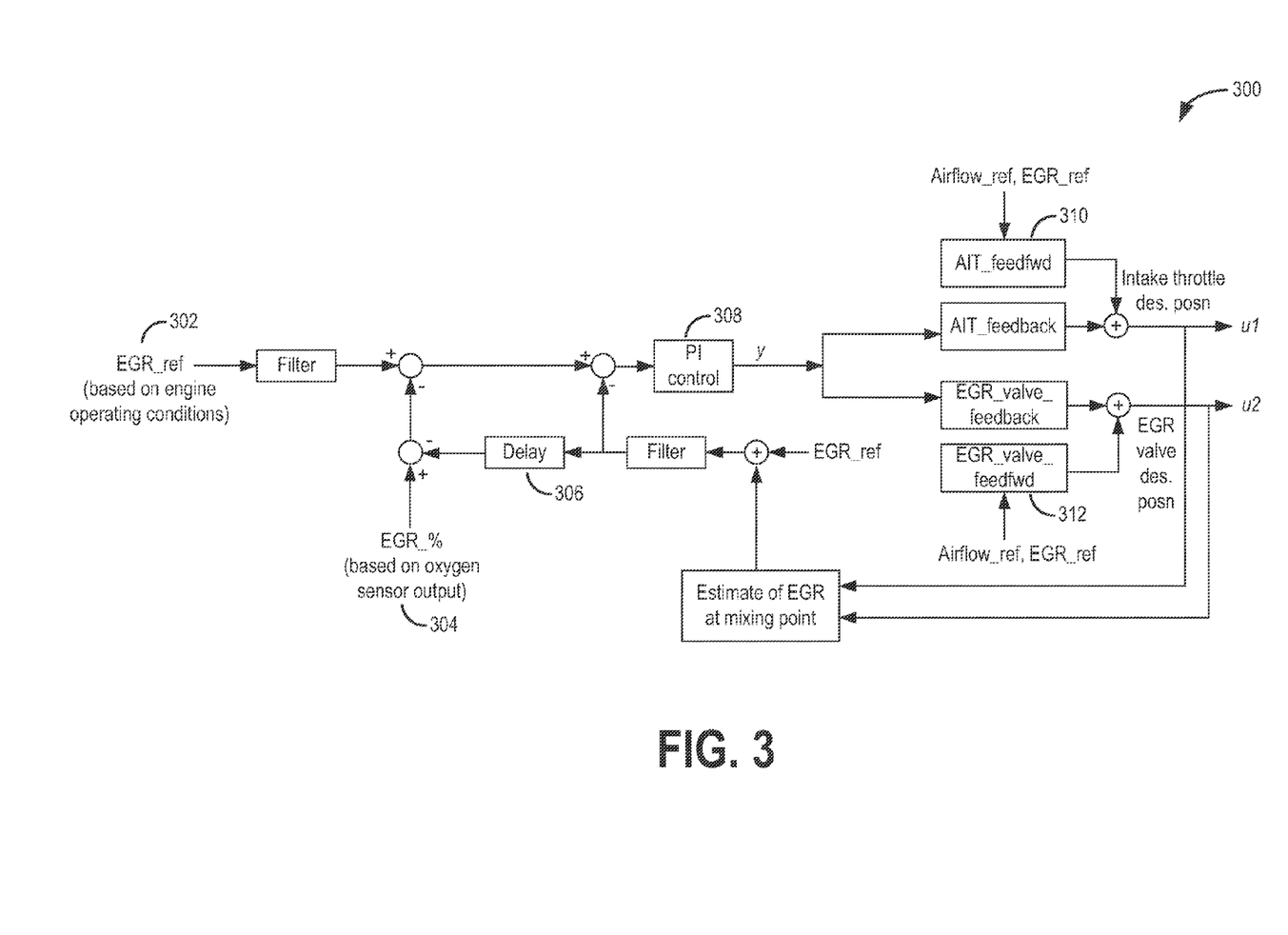
FIGS. 3-4 show example approaches for EGR dilution delivery control.
Figure 4:
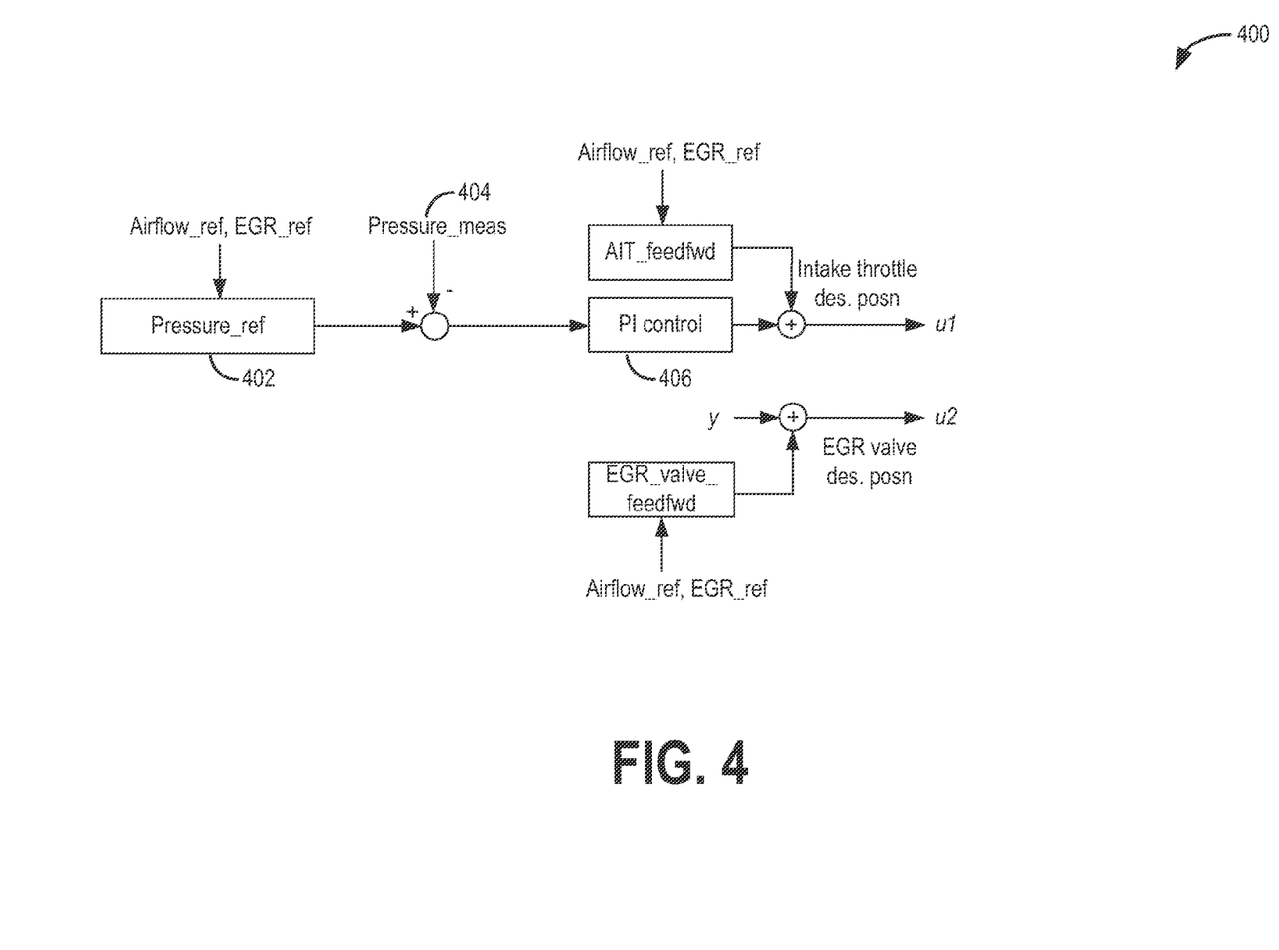
Figure 5:
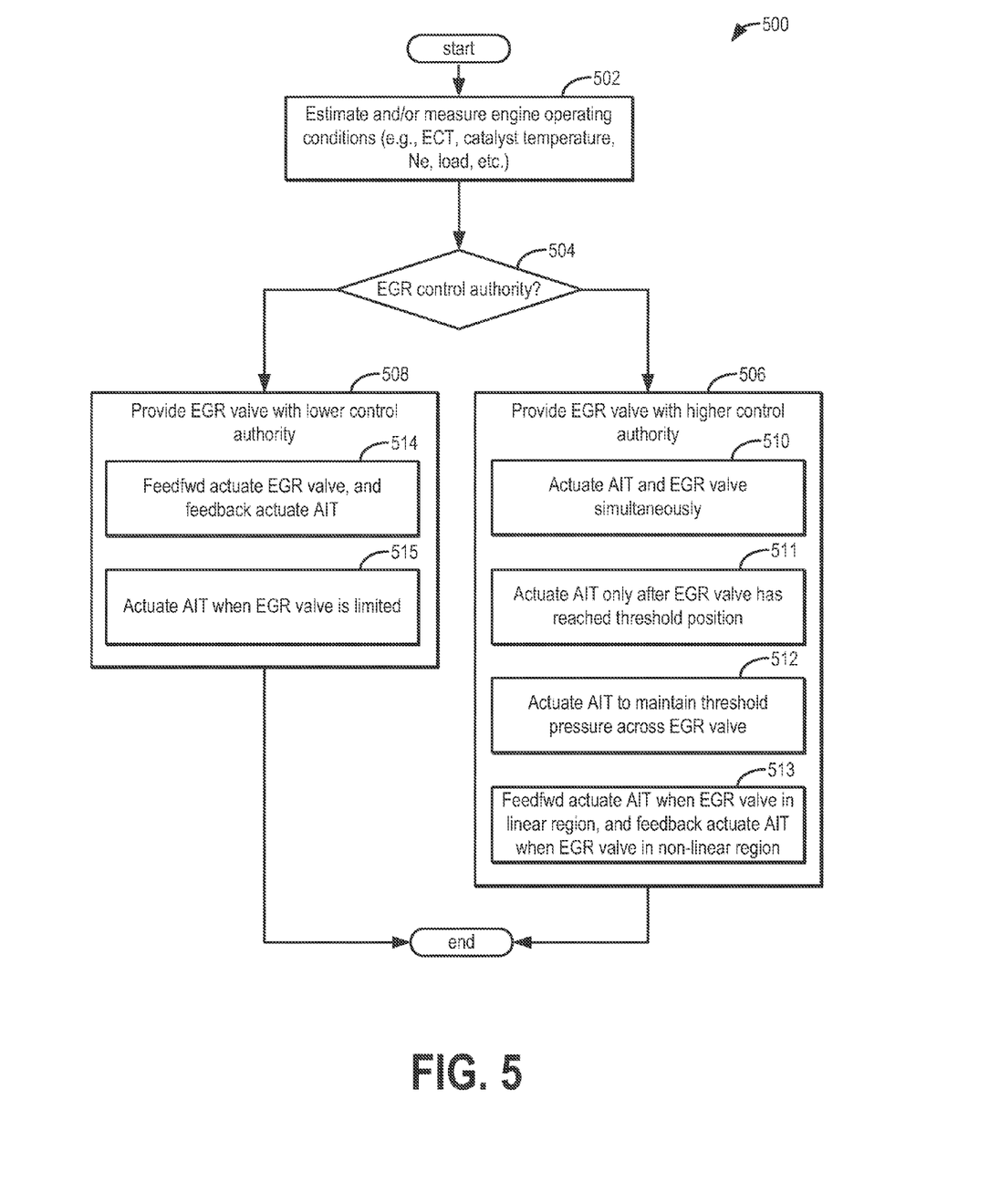
FIG. 5 shows a high level flow chart illustrating a routine for selecting an EGR valve and first intake throttle adjustment to provide a desired level of EGR control authority.

The following description relates to systems and methods for controlling dilution of exhaust gas for exhaust gas recirculation based on the output of an intake oxygen sensor. As shown in FIG. 1, a boosted engine may be configured with a low-pressure exhaust gas recirculation (EGR) system that may include an EGR valve for adjusting an amount of exhaust gas recirculated to the engine intake. The engine may further include a plurality of intake throttles including at least a first and second intake throttle coupled to the engine intake, the throttles configured to adjust an amount of fresh air directed to the engine intake. Specifically, the first, upstream, air intake throttle may adjust an amount of fresh air diluted with the exhaust gas in the EGR flow, while a second main intake throttle, downstream of the first air intake throttle and the EGR valve, may adjust the flow of an intake gas stream entering the engine intake. An oxygen sensor coupled to the engine intake may be configured to estimate the oxygen content of the intake gas stream, and infer an amount of EGR flow. As shown in FIG. 2, an engine controller may infer a percent dilution of the EGR flow based on the output of the oxygen sensor using a model that takes into account the dilution propagation of EGR from a mixing point downstream of the EGR valve and first intake throttle. The controller may then perform EGR valve and first air intake throttle adjustments to provide a desired EGR flow. As shown in FIGS. 3-4, the engine may use various approaches for providing the desired EGR dilution. As shown in FIG. 5, an engine control may select an approach from the possible options based on a desired level of EGR control authority. The engine controller may also adjust the second main intake throttle based on the output of the oxygen sensor to compensate for torque disturbances arising from the EGR valve and first air intake throttle adjustments. In this way, EGR valve and throttle adjustments may be better coordinated to rapidly and precisely provide the desired amount of EGR while maintaining the desired torque. Further, by using the output of a single oxygen sensor to infer the EGR dilution and perform the adjustments, component reduction benefits may be achieved without affecting system accuracy.

FIG. 1 shows a schematic depiction of a vehicle system 6. The vehicle system 6 includes an engine system 8, including engine 10 coupled to emission control system 22. Engine 10 includes a plurality of cylinders 30. Engine 10 also includes an intake 23 and an exhaust 25. Intake 23 may receive fresh air from the atmosphere through intake passage 42. Intake passage 42 may include a first air intake throttle 82 configured to adjust the amount of fresh air that is received through intake passage 42. Intake 23 may further include a second main intake throttle 62 fluidly coupled to the engine intake manifold 44 via intake passage 42. Second intake throttle 62 may be positioned downstream of first intake throttle 82, and may be configured to adjust the flow of an intake gas stream entering engine intake manifold 44. Exhaust 25 includes an exhaust manifold 48 leading to an exhaust passage 45 that routes exhaust gas to the atmosphere via tailpipe 35.

Engine 10 may be a boosted engine including a boosting device, such as turbocharger 50. Turbocharger 50 may include a compressor 52, arranged along intake passage 42, and a turbine 54, arranged along exhaust passage 45. Compressor 52 may be at least partially driven by turbine 54 via shaft 56. The amount of boost provided by the turbocharger may be varied by an engine controller. An optional charge after-cooler 84 may be included downstream of compressor 52 in the intake passage to reduce the temperature of the intake air compressed by the turbocharger. Specifically, aftercooler 84 may be included downstream of first intake throttle 82 and upstream of second intake throttle 62 or integrated into the intake manifold 44.

Emission control system 22, coupled to exhaust passage 45, may include one or more emission control devices 70 mounted in a close-coupled position in the exhaust. One or more emission control devices may include a particulate filter, SCR catalyst, three-way catalyst, lean NOx trap, oxidation catalyst, etc. The emission control devices may be positioned upstream and/or downstream (as depicted) of turbine 54 in exhaust passage 45.

Engine 10 may further include one or more exhaust gas recirculation (EGR) passages for recirculating at least a portion of exhaust gas from exhaust passage 45 to intake passage 42. For example, the engine may include a low-pressure EGR (LP-EGR) system 72 with an LP-EGR passage 73 coupling the engine exhaust, downstream of turbine 54, to the engine intake, upstream of compressor 52. LP-EGR system 72 may be operated during conditions such as in the presence of turbocharger boost and/or when exhaust gas temperature is above a threshold. Additionally, by adjusting first intake throttle 82, LP-EGR system 72 may be operated during conditions such as in the absence of turbocharger boost or in the presence of low boost levels. An EGR valve 39, positioned in LP-EGR passage 73 upstream of the compressor, may be configured to adjust an amount and/or rate of exhaust gas diverted through the EGR passage. LP-EGR passage 73 may further include an LP-EGR cooler 74, positioned upstream or downstream of EGR valve 39 (herein, depicted downstream of EGR valve 39), to lower the temperature of exhaust gas being recirculated into the engine intake. In this configuration, the EGR passage may be configured to provide low pressure EGR, and EGR valve 39 may be a LP-EGR valve. In alternate embodiments, a high-pressure EGR (HP-EGR) system (not shown) may also be included wherein a HP-EGR passage may be configured to divert at least some exhaust gas from the engine exhaust, upstream of the turbine, to the engine intake, downstream of the compressor.

In some embodiments, one or more sensors may be positioned within LP-EGR passage 73 to provide an indication of one or more of a pressure, temperature, and air-fuel ratio of exhaust gas recirculated through the LP-EGR passage. Exhaust gas diverted through LP-EGR passage 73 may be diluted with fresh intake air at mixing point 90, located at the junction of LP-EGR passage 73 and intake passage 42. Specifically, by adjusting EGR valve 39 in coordination with first air intake throttle 82 (positioned in the air intake passage of the engine intake, upstream of the compressor), a dilution of the EGR flow may be adjusted.

A percent dilution of the EGR flow, at and beyond mixing point 90, may be inferred from the output of an oxygen sensor 92 positioned downstream of the mixing point, in the engine intake gas stream. Specifically, oxygen sensor 92 may be positioned downstream of first intake throttle 82, downstream of EGR valve 39, and upstream of second main intake throttle 62, such that the EGR dilution at or close to the main intake throttle may be accurately determined. Oxygen sensor 92 may be, for example, a UEGO sensor. As elaborated in FIG. 2, an engine controller may estimate the percent dilution of the EGR flow based on feedback from oxygen sensor 92 using a model that accounts for delays in dilution propagation of EGR flow from mixing point 90 to intake manifold 44. For example, the model may compensate for relatively long delays between EGR valve actuation and observed changes in dilution concentration at oxygen sensor 92. The controller may then adjust EGR valve 39 and first air intake throttle 82 to provide a desired EGR dilution, as elaborated herein with reference to FIGS. 3-4. By using a delay compensation model, the responsiveness of the system to the output of the oxygen sensor may be substantially increased. In one example, the delay compensation may enable speeding up the response of the system by a factor of 2 to 5.

Engine 10 may be controlled at least partially by a control system 14 including controller 12 and by input from a vehicle operator via an input device (not shown). Control system 14 is configured to receive information from a plurality of sensors 16 (various examples of which are described herein) and sending control signals to a plurality of actuators 81. As one example, sensors 16 may include exhaust gas oxygen sensor 126 coupled to exhaust manifold 48, an exhaust temperature sensor 128 and exhaust pressure sensor 129 located downstream of the emission control device 70 in tailpipe 35, oxygen sensor 92 coupled upstream of main intake throttle 62, and various sensors (not shown) in LP-EGR passage 73. Various exhaust gas sensors may also be included in exhaust passage 45 downstream of emission control device 70, such as particulate matter (PM) sensors, NOx sensors, oxygen sensors, ammonia sensors, hydrocarbon sensors, etc. Other sensors such as additional pressure, temperature, air/fuel ratio and composition sensors may be coupled to various locations in the vehicle system 6. As another example, actuators 81 may include fuel injector 66, EGR valve 39, first air intake throttle 82, and main intake throttle 62. Other actuators, such as a variety of additional valves and throttles, may be coupled to various locations in vehicle system 6. Controller 12 may receive input data from the various sensors, process the input data, and trigger the actuators in response to the processed input data based on instruction or code programmed therein corresponding to one or more routines. An example control routine is described herein with regard to FIG. 2.

Now turning to FIG. 2, an example routine 200 is shown for performing adjustments to an EGR valve, a first air intake throttle, and a main intake throttle to provide a desired EGR dilution and flow, while maintaining the desired torque.

At 202, engine operating conditions may be estimated and/or measured. These may include, for example, engine speed, driver-requested torque, engine coolant temperature, catalyst temperature, VCT, MAP, BP, MAT, etc. At 204, based on the estimated operating conditions and desired torque, a desired amount of EGR (EGR_ref) may be determined. This may include determining a desired EGR percent dilution based on speed, load, engine temperature, and other engine operating conditions. At 206, the output of the intake oxygen sensor may be received. At 208, based on the oxygen sensor output, the available EGR dilution (EGR_%) may be determined. In one example, the sensor output may be received as a sensor voltage. The sensor voltage may be a measure of the oxygen concentration of the intake gas stream. Thus, based on the oxygen concentration, the percent dilution of EGR in the intake gas stream, that is a ratio of fresh air and recirculated exhaust gas in the intake gas stream, may be determined.

At 210, a feed-forward position of the first air intake throttle and the EGR valve may be determined based on actual or desired air flow, EGR_ref, and engine operating conditions, such as, air temperature, BP, estimated EGR temperature, post-EGR cooler pressure, etc. At 212, a feedback adjustment required to enable the available EGR dilution (EGR_%) to match the desired EGR (EGR_ref) may be computed. As elaborated with reference to FIGS. 3-4, the feedback adjustment may be determined based on the output of the oxygen sensor using proportional-integral (PI) control and delay compensation, thereby enabling the engine controller to respond faster to the oxygen sensor output despite relatively long delays in EGR delivery and propagation. The delay compensation model may be based on the transient behavior of oxygen concentrations in the EGR flow along the air intake passage, between the mixing point and the oxygen sensor, in response to changes in EGR valve and/or first air intake throttle actuation. In one example, the delay compensation model may be a modified version of a Smith Predictor. As such, Smith Predictors may be used for linear single-sensor/single-actuator passages. Herein, the modifications incorporated in the Smith Predictor for determining the EGR dilution and delivery may allow for operation with two non-linear actuators (in this case, the EGR valve and the first air intake throttle), as well as to prevent the double counting of the adjustment needed to respond to a change in EGR dilution through feedback and feed-forward channels.

At 214, EGR valve adjustments and first air intake throttle adjustments may be determined based on the output of the PI controller. Specifically, based on the output (y) of the PI controller, and the type of control action desired (such as, whether the adjustment is to be sequential or simultaneous, or an alternate control action), a first air intake throttle adjustment (u1) and an EGR valve adjustment (u2) may be determined.

FIG. 3 shows an example approach 300 for EGR dilution control and delivery. By using feedback control from an oxygen sensor along with delay compensation modeled on dilution propagation, a percent dilution of the intake gas stream, may be determined, and based on a difference between the percent dilution and the feed-forward desired amount of EGR, EGR valve and first air intake throttle adjustments may be performed to provide the desired EGR flow.

As previously elaborated, a desired EGR dilution, EGR_ref 302, may be determined based on engine operating conditions and driver demand, and processed through a filter. A feed-forward position of the EGR valve, EGR_valve_feedfwd 312, and the feed-forward position of the first air intake throttle, AIT_feedfwd 310, may also be determined based on air flow (actual or desired), EGR_ref, and engine operating conditions, such as air temperature, barometric pressure, estimated EGR temperature, post-EGR cooler pressure, etc.

The available EGR dilution (EGR_%) 304 may be determined based on the output of the intake oxygen sensor, with a delay compensation 306 accounting for dilution propagation. In one example, a relatively simple model based on a transport (time) delay and a first order low pass filter describing mixing dynamics may be used. As such, the delay and the time constant of the filter may depend on the engine operating conditions. In one example, when the engine speed is 2500 rpm and the engine load is 7 bar BMEP, the delay may be 0.34 sec and the time constant may be 0.25 sec.

A feedback adjustment y may then be computed by a PI controller at PI control 308 based on a comparison between EGR_ref 302 and EGR_% 304. Specifically, feedback adjustment y may be computed to ensure that the actual EGR dilution at the main intake throttle matches the desired EGR dilution. Following the comparison, feedback adjustment y may be converted into commands u1 and u2 representing the action of two actuators, viz. the EGR valve and the first air intake throttle, respectively. For example, in response to the oxygen sensor output indicating that EGR dilution is higher than a threshold, an adjustment of the actuators may include closing the EGR valve and opening the first air intake throttle.

In one example, the delay compensation model used by the PI controller may be a modified version of a Smith Predictor with modifications incorporated in to the Smith Predictor for determining the EGR dilution and delivery may allow for operation with the two non-linear actuators (herein the EGR valve and the first air intake throttle), as well as to prevent the double counting of the adjustment needed to respond to a change in EGR dilution through feedback and feed-forward channels. Thus, the delay compensation model may account for EGR dilution and propagation changes from the amount estimated at the mixing point of the fresh air and the recirculated exhaust gas (mixing point 90 of FIG. 1) to the amount received in the engine intake (as estimated from the intake oxygen sensor).

Returning to FIG. 2, at 214, various approaches may be used to convert the output of the PI controller (y) into the action of the two actuators, the EGR valve, and the first air intake throttle. In one example, the EGR valve and first air intake throttle adjustments may be simultaneous. Herein, the adjustments may include proportionally opening the first air intake throttle as the EGR valve is closed, or proportionally opening the first intake throttle as the EGR valve is closed. In one example, the first air intake throttle command u1 and the EGR valve command u2 may be determined as:

$u1 = f_1(\text{desired\_air}, \text{desired\_egr}, BP) - K_{AIT} y$ $u2 = f_2(\text{desired\_air}, \text{desired\_egr}, BP) + K_{EGR} y$ wherein BP represents barometric pressure. Herein, the y terms may have different signs to ensure that the EGR valve moves in the opposite direction of the first air intake throttle. That is, one closes as the other opens, and vice versa. Gains $K_{AIT}$ and $K_{EGR}$ may be scheduled with the desired EGR, although other parameters indicative of operating conditions may also be used, such as air flow and engine speed. As such, both feedback commands may be clipped, or filtered, to stay within a desired range. For example, the feedback commands for the actuators may be limited between a first, lower threshold and a second, upper threshold.

In another example, the adjustments of the EGR valve and the first intake throttle may be weighted. For example, the adjustment of the EGR valve may have a first, higher weight while the adjustment of the first air intake throttle may have a second, lower weight. In one example, to give the EGR valve a dominant role (more weight) in delivering the desired dilution or oxygen concentration, a low pass filtering of PI control output y may be used in the calculation of the first air intake throttle command u1. As such, this may also help to reduce first air intake throttle based disturbances to the main intake throttle control. Herein, first air intake throttle command u1 may be determined as:

$$u1 = f_1(\text{desired\_air}, \text{desired\_egr}, BP) - \frac{K_{IAT}}{\tau s + 1} y$$

In another example, the adjustments may be sequential, with the first air intake throttle actuated only when the EGR valve has reached a predetermined position, has run out of control authority, or has entered a nonlinear region near the end of its travel. That is, the adjustment of the first intake throttle may follow the adjustment of the EGR valve, and further may be based on the position of the EGR valve following the EGR valve adjustment. For example, opening the first air intake throttle may include opening the first air intake throttle after the EGR valve has crossed a threshold position. An enable strategy may be determined as:

if $u2 > \alpha$, OR $u2 < \beta$, then $u1 = f_1(\text{desired\_air}, \text{desired\_egr}, BP) - K_{AIT} y$ else, $u1 = f_1(\text{desired\_air}, \text{desired\_egr}, BP)$ where $\alpha$ is at or near the open position and $\beta$ is at or near the closed position.

Thus in one example, adjusting the first intake throttle may include feed-forward adjusting the first intake throttle when the EGR valve is before a threshold position, or within a linear region of operation, and feedback adjusting the first intake throttle when the EGR valve is beyond the threshold position, or outside the linear region of operation (that is, when the EGR valve is within a non-linear region of operation). Further, the feedback adjustment of the first intake throttle may be limited to a direction that supplements the authority of the EGR valve. As such, before the threshold position and/or when within the linear region of operation, the EGR valve may have a higher control authority over EGR flow. In comparison, after the threshold position and/or when outside the linear region of operation (that is, within the non-linear region of operation), the EGR valve may have a lower control authority over EGR flow. Under such conditions, the first intake throttle may be adjusted to provide a higher control authority over the EGR flow.

Once feedback with the first air intake throttle is enabled, it can be disabled when the EGR valve command is farther from its endpoints (than $\alpha$ and $\beta$) to avoid cycling in and out of feedback passages and to push the EGR valve operation towards the middle of its operating range. A disable strategy may be determined as:

if $u2 < (\alpha - a)$, AND $u2 > (\beta + b)$, then $u1 = f_1(\text{desired\_air}, \text{desired\_egr}, BP)$ Thus, in one example, the adjustment may include enabling the first intake throttle when the EGR valve is positioned before a threshold position (or within a first, linear region of operation), and disabling the first intake throttle when the EGR valve is positioned at or after the threshold position (or within a second, non-linear region of operation).

In still another example, as elaborated in FIG. 4, the adjustments to the first air intake throttle and EGR valve may be adjusted to deliver a desired pressure value. The pressure value may include, for example, a desired compressor inlet pressure or a desired depression, that is, pressure differential, across the first intake throttle, low pressure air induction system, low pressure EGR passage, or EGR valve. As such, the low pressure air induction system refers to the portion of the air induction system upstream of the compressor, including the first air intake throttle and any intake air cleaners. Thus, in one example, adjusting the first intake throttle may include adjusting the first intake throttle to maintain a threshold pressure difference across the EGR valve, or the low pressure EGR passage. In another example, adjusting the first intake throttle may include adjusting the first intake throttle to maintain a threshold pressure value across the turbocharger compressor. Such a decentralized control strategy for first air intake throttle adjustments may be used to ensure that there always is sufficient pressure differential across the EGR valve (for example, greater than a threshold), thereby giving the EGR valve the authority to deliver the desired EGR.

Turning to FIG. 4, an example approach 400 for EGR dilution control and delivery based on a desired pressure value is shown. Herein, a desired compressor inlet pressure, or pressure differential, pressure_ref 402, may be determined based on the desired air flow (air flow_ref) and the desired EGR dilution, EGR_ref. A PI controller may perform PI control 406 by comparing the desired pressure value, pressure_ref 402 to a measured or estimated pressure, pressure_meas 404 to determine a first air intake throttle command u1. Feed-forward first air intake throttle position and EGR valve position data may also be used to determine first intake throttle command u1 and EGR valve command u2.

It will be appreciated that while the above mentioned examples illustrate the commands based on feedback PI control, in alternate embodiments, other control methodologies may be used in place of, or in addition to, PI control to execute a feedback command.

Returning to FIG. 2, in still another example, the adjustments determined at 214 may include adjusting the first air intake throttle with a feed-forward command only, with adaptation to account for slow changes in pressure, such as slowly changing pressure drops, in the air induction or exhaust systems. In one example, such pressure changes may occur due to a clogged or dirty air filter in the air induction system. The adaptations to the feed-forward command may be based on, for example, a difference between the expected, or modeled, EGR valve command and the actual EGR valve command in steady state. Alternatively, the adaptation may be based on a difference between the long term averages of the expected and actual EGR valve commands, when EGR is being applied. Such an approach allows the EGR valve to be kept in a linear operating range over the life of the vehicle, while minimizing first air intake throttle disturbances to main intake throttle control and torque delivery.

In one example, such an approach of using a feed-forward adjustment of the first air intake throttle may be used in conjunction with a sequential adjustment of the first air intake throttle and the EGR valve wherein feedback adjustment of the first air intake throttle is enabled only when the EGR valve has run out of control authority, or has entered a non-linear region. Such a combined approach may allow the system to compensate for relatively fast changes in conditions, such as due to packing of snow.

In yet another example, the EGR valve may be adjusted only with a feed-forward command, or set to a fixed position, while the first air intake throttle is controlled with a feedback command based on the output of the PI controller (y) so as to deliver the desired amount of EGR. That is, the adjustment may include, feedforward adjusting the EGR valve while feedback adjusting the first intake throttle to provide the desired amount of EGR.

In still another example, the adjustments may be modified if a primary actuator is limited. In one example, the EGR valve may be the primary actuator, and may be unable to deliver the desired EGR flow due to saturation. Herein, EGR control and the desired EGR flow may be achieved by using the other actuator, herein the first air intake throttle.

The actuator commands may be determined as:

if $u2 > \alpha$, then $u1 = f_1(\text{desired\_air}, \text{desired\_egr}, BP) - K_{AIT} y$ $u2 = \min(\alpha, f_2(\text{desired\_air}, \text{desired\_egr}, BP) + K_{EGR} y)$ else, $u1 = f_1(\text{desired\_air}, \text{desired\_egr}, BP)$ $u2 = f_2(\text{desired\_air}, \text{desired\_egr}, BP) + K_{EGR} y$ where $\alpha$ is at or near the open position.

In one example, the adjustment may include, during a first condition, when the EGR valve is limited, maintaining the EGR valve at a first position while adjusting the first intake throttle responsive to the output of the oxygen sensor to provide the desired amount of EGR. The adjustment may further include, during a second condition, when the first intake throttle is limited, maintaining the first intake throttle at a second position while adjusting the EGR valve responsive to the output of the oxygen sensor to provide the desired amount of EGR.

In still another example, as shown in FIG. 3, the percent EGR dilution delivered at the mixing point of fresh air and recirculated exhaust gas (mixing point 90 of FIG. 1) may be estimated based on the commands issued to the actuators (u1 and u2) and/or measured positions along with other variables, and the output may be included into the delay compensation model to enable further adjustments to the actuator commands.

As elaborated with reference to FIG. 5, a controller may select an approach from the various options elaborated above based on a desired level of EGR control authority. For example, during conditions when a higher level of EGR control authority is desired, such as when exhaust temperatures are lower than a threshold, an approach may be selected that allows EGR control (and optionally EGR valve) authority to be higher. In another example, during conditions when a lower level of EGR control authority is desired, such as when exhaust temperatures are higher than a threshold, an approach may be selected that allows EGR control (and optionally EGR valve) authority to be lower, at least temporarily. By selecting an EGR valve and first air intake throttle adjustment approach based on the desired EGR control authority, the desired EGR control may be better provided.

At 216, an adjustment of the second main intake throttle may be determined based on the output of the oxygen sensor to maintain a desired torque during the EGR valve and first air intake throttle adjustments. In one example, in response to the oxygen sensor output indicating EGR dilution is higher than a threshold, the EGR valve may be closed while the first air intake throttle is opened to provide the desired EGR flow.

Herein, the second main intake throttle may also be adjusted in response to an indication of EGR dilution based on the oxygen sensor output to reduce torque transients arising during the EGR valve and first air intake throttle adjustment. For example, the second main intake throttle may move in the open direction when EGR dilution is higher and in the closed direction when the EGR dilution is lower. At 218, the EGR valve, first air intake throttle, and second main intake throttle may be adjusted according to the determined adjustments. In one example, the second intake throttle adjustment may follow the EGR valve and first intake throttle adjustment by a delay time to account for changes in EGR flow, and delays in EGR flow propagation, from the time and location of the first air intake throttle and EGR valve adjustment to the time and location of flow sending by the oxygen sensor. For example, the delay time may be filtered to approximate EGR concentration mixing effects and a first order lag effect due to axial diffusion. In another example, the delay time may be based on the distance between the throttles, EGR flow rate, engine operating conditions, etc. Similarly, the second intake throttle adjustment may also be filtered to approximate EGR concentration mixing effects and a first order lag effect due to axial diffusion. As such, based on engine operating conditions, the desired EGR flow may be provided by actuating both the EGR valve and the first air intake throttle, or by only actuating the EGR valve. Thus, during a first condition, such as when the first intake throttle is within a linear region of operation (that is, the first intake throttle is not close to being fully open or fully closed), the EGR valve and the first intake throttle may be adjusted responsive to the output of the oxygen sensor to provide the desired EGR flow. In comparison, during a second condition, such as when the first intake throttle is within a non-linear region of operation, for example the first intake throttle is close to a closed position, the first intake throttle may be adjusted to move in a direction of improved linearity, responsive to the output of the oxygen sensor, to provide the desired EGR flow. For example, the first intake throttle may be moved towards a less closed, that is, more open position. Optionally, the EGR valve may also be adjusted responsive to the output of the oxygen sensor to provide the desired EGR flow. In one example, the first condition may include a smaller pressure difference across the EGR valve while the second condition may include a larger pressure difference across the EGR valve. Herein, when the pressure difference across the EGR valve is smaller, first intake throttle adjustments may be advantageously used in conjunction with EGR valve adjustments to provide the desired EGR flow. In comparison, when the pressure difference across the EGR valve is higher, a wider range of EGR valve adjustments may be possible, and thus additional adjustments of the first air intake throttle may not be required. As such, during the first or second condition, the second, downstream, intake throttle may be adjusted responsive to the output of the oxygen sensor to maintain the desired torque.

Now turning to FIG. 5, an example routine 500 is shown for selecting an approach for coordinating EGR valve and first air intake throttle adjustments based on a desired EGR control authority.

At 502, engine operating conditions may be estimated and/or measured. These may include, for example, engine speed, load, engine temperature, catalyst temperature. At 504, it may be determined whether EGR control authority is desired. In one example, a higher level of EGR control authority may be desired when exhaust temperatures are lower, for example, lower than a threshold. During such conditions, EGR control may be advantageously used to improve the fuel economy or performance by reducing the propensity of the engine to knock. In another example, a lower level of EGR control authority may be desired when exhaust temperatures are elevated, for example, higher than a threshold. Herein, an engine controller may give a higher control authority to adjustments that enable better control over torque transients and disturbances, and EGR control may be given a lower authority, at least temporarily.

If a higher EGR control authority is desired, then at 506, the controller may select an approach from the various options available that gives a higher EGR control authority. In one example, as shown herein, approaches that give the EGR valve a higher control authority (than the first air intake throttle) may also give a higher EGR control authority. Thus, the controller may select adjustments that allow the EGR valve to have a higher control authority over EGR adjustments. As one example, at 510, the controller may select an approach wherein the first air intake throttle and the EGR valve are adjusted simultaneously, in opposite directions. As previously elaborated, this may include proportionally closing the first air intake throttle as the EGR valve is opened. In one example, such a simultaneous adjustment approach may be used when a wider range of EGR control is desired. Alternatively, at 511, the controller may select an approach wherein the first air intake throttle and the EGR valve are adjusted sequentially. As previously elaborated, this may include first actuating the EGR valve, and then actuating, or enabling, the first air intake throttle only after the EGR valve has reached a predetermined position (or crossed a threshold position). In one example, first, the EGR valve may be actuated within a linear region of operation. Then, when the EGR valve is close to the end of, or outside of, the linear region, the first air intake throttle may be actuated. Such a sequential adjustment approach may be used, for example, when a narrower range of EGR control is desired.

Alternatively, at 512, the controller may select an approach wherein the first air intake throttle is adjusted to maintain a desired pressure, or pressure differential, across the EGR valve to maintain the EGR valve's control authority. Due to the positioning of the EGR valve vis-à-vis the turbocharger, in one example, the desired pressure differential across the EGR valve may be provided by adjusting the first air intake throttle to maintain a desired compressor inlet pressure, or a desired pressure differential across the compressor, or a desired pressure differential across the low pressure air induction system. In one example, such a pressure-based approach may be selected during boosted engine operation.

Alternatively, at 513, the controller may select an approach wherein the first air intake throttle is adjusted with feed-forward adjustments only, while the EGR valve is adjusted with feed-forward and feedback adjustments. As previously elaborated, this may include feed-forward actuating the first air intake throttle when the EGR valve is in a linear region of operation, and feedback actuating the first air intake throttle when the EGR valve is outside the linear region of operation.

If a higher EGR control authority is not desired, then at 508, the controller may select an approach from the various options available that gives a lower EGR control authority. In one example, as shown herein, approaches that give the EGR valve a lower control authority (than the first air intake throttle) may also give a lower EGR control authority. In another example, approaches that transfer control authority to the first air intake throttle may also give a lower EGR control authority. Thus, the controller may select adjustments that allow the EGR valve to have a lower control authority over EGR adjustments. As such, lower EGR control authority may be desired to enable better control over transient torque disturbances. As one example, at 514, the controller may select an approach wherein the EGR valve is adjusted with feed-forward adjustments only, while the first air intake throttle is adjusted with feed-forward and feedback adjustments. In one example, feed-forward actuating the EGR valve may include setting the EGR valve to a predetermined position, the position based on engine operating conditions. Alternatively, at 515, the controller may select an approach wherein the desired EGR flow is largely provided by the first air intake throttle.

In this way, the EGR valve and the first intake throttle may be adjusted to provide higher EGR control authority when an exhaust temperature is lower than a threshold, and provide lower EGR control authority when the exhaust temperature is higher than the threshold. By adjusting the order the adjustments based on the desired EGR control authority, EGR control may be improved. By adjusting an EGR valve and a first air intake throttle in a coordinated manner responsive to the output of an oxygen sensor, control of the distributed valves and throttles may be better achieved, thereby improving EGR flow control. By using an EGR valve and a first air intake throttle to provide EGR flow, EGR control may be achieved even when one of the actuators is limited, or is within a non-linear region of operation. Additionally, by using the output of an oxygen sensor to adjust EGR flow, the need for multiple sensors to estimate EGR may be reduced. By adjusting the main intake throttle in coordination with the EGR valve and the first air intake throttle, the desired torque may be provided while EGR flow is adjusted. By improving engine EGR operations, engine performance may be improved.

Note that the example control and estimation routines included herein can be used with various engine and/or vehicle system configurations. The specific routines described herein may represent one or more of any number of processing strategies such as event-driven, interrupt-driven, multi-tasking, multi-threading, and the like. As such, various acts, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated acts or functions may be repeatedly performed depending on the particular strategy being used. Further, the described acts may graphically represent code to be programmed into the computer readable storage medium in the engine control system.

The invention claimed is:

1. A method for an engine including an EGR passage comprising,
    adjusting an EGR valve and a first intake throttle responsive to an output of an oxygen sensor positioned downstream of the first intake throttle and EGR valve and a desired EGR amount; and
    adjusting a second intake throttle positioned downstream of the first intake throttle, EGR valve, and oxygen sensor responsive to the oxygen sensor output and a desired torque to maintain the desired torque.

2. The method of claim 1, wherein the engine includes a turbocharger, and the EGR passage couples an engine exhaust, downstream of a turbine, to an engine intake, upstream of a compressor and wherein the EGR valve is positioned in the EGR passage, upstream of the compressor, and wherein the first intake throttle is positioned in an air intake passage of the engine intake, upstream of the compressor.

3. The method of claim 2, wherein the engine further includes an EGR cooler upstream or downstream of the EGR valve.

4. The method of claim 2, wherein the oxygen sensor is positioned in the air intake passage and the second intake throttle is fluidly coupled to an intake manifold of the engine and positioned upstream of a plurality of cylinders of the engine.

5. The method of claim 1, wherein adjusting the EGR valve and the first intake throttle includes, in response to the oxygen sensor output indicating EGR dilution higher than a threshold, closing the EGR valve and opening the first intake throttle.

6. The method of claim 5, wherein opening the first intake throttle includes proportionally opening the first intake throttle as the EGR valve is closed.

7. The method of claim 5, wherein opening the first intake throttle includes opening the first intake throttle after the EGR valve has crossed a threshold position.

8. The method of claim 5, wherein adjusting the second intake throttle includes, in response to the oxygen sensor output indicating EGR dilution higher than a threshold, opening the second intake throttle and wherein the second intake throttle adjustment is filtered to approximate EGR concentration mixing effects.

9. The method of claim 5, wherein the adjustment further includes, adjusting the EGR valve and the first intake throttle to provide higher EGR control authority when an exhaust temperature is lower than a threshold, and provide lower EGR control authority when the exhaust temperature is higher than the threshold.

10. The method of claim 1, wherein the first EGR valve and the first intake throttle are operated in response to a model representing transport delays and mixing effects occurring in an air intake of the engine, between a mixing point and the oxygen sensor.

11. The method of claim 1, wherein adjusting the EGR valve and the first intake throttle includes adjusting the EGR valve in coordination with the first intake throttle to deliver the desired EGR amount and wherein adjusting the second intake throttle includes adjusting the second intake throttle in coordination with adjusting the EGR valve and the first intake throttle to provide the desired torque while EGR flow is adjusted.

12. A method of operating an engine including an EGR passage coupled between an engine intake and an engine exhaust comprising,
    during a first condition wherein a first intake throttle is operating within a linear region, adjusting an EGR valve and the first intake throttle responsive to an output of an oxygen sensor arranged in the engine intake and a desired amount of EGR;
    during a second condition wherein the first intake throttle is operating within a non-linear region, adjusting only the EGR valve responsive to the output of the oxygen sensor and the desired amount of EGR; and
    during the first or second condition, adjusting a second intake throttle, downstream of the first intake throttle, responsive to the output of the intake oxygen sensor to maintain a desired torque.

13. The method of claim 12, wherein during the first condition, the second intake throttle adjustment follows the first intake throttle and EGR valve adjustment by a delay time, the delay time and the second intake throttle adjustment filtered to approximate EGR concentration mixing effects.

14. The method of claim 13, wherein during the first condition, adjusting the first intake throttle includes adjusting the first intake throttle to maintain a threshold pressure difference across the EGR valve.

15. The method of claim 13, wherein during the first condition, adjusting the first intake throttle includes feed-forward adjusting the first intake throttle when the EGR valve is within a linear region of operation, and feedback adjusting the first intake throttle when the EGR valve is outside the linear region of operation and wherein the feedback adjustment of the first intake throttle is disabled when the EGR valve is at a threshold position.

16. The method of claim 12, wherein adjusting the EGR valve and the first intake throttle responsive to the output of the oxygen sensor and the desired EGR amount further comprises adjusting the first intake throttle and the EGR valve in opposite directions.

17. The method of claim 12, wherein the oxygen sensor is positioned downstream of the EGR valve and the first intake throttle and upstream of the second intake throttle, wherein the second intake throttle is positioned upstream of a plurality of engine cylinders, and wherein the first intake throttle is positioned upstream of where the EGR passage couples to the engine intake.

18. A method of operating an engine including an EGR passage and an oxygen sensor comprising, adjusting an EGR valve and a first intake throttle in opposite directions responsive to an output of the oxygen sensor and a desired EGR amount; and adjusting a second intake throttle responsive to the output of the oxygen sensor and a desired torque to maintain the desired torque.

19. The method of claim 18, wherein the oxygen sensor is positioned in an engine intake between the first and second intake throttles, wherein adjusting the EGR valve and the first intake throttle in opposite directions includes adjusting the EGR valve in one direction in coordination with adjusting the first intake throttle in an opposite direction to deliver the desired EGR amount, and wherein adjusting the second intake throttle includes adjusting the second intake throttle in coordination with adjusting the EGR valve and the first intake throttle to provide the desired torque while EGR flow is adjusted.

20. The method of claim 19 wherein the EGR passage is a low-pressure EGR passage coupled between upstream of a compressor and downstream of a turbine, the EGR passage further including an EGR cooler, wherein the first throttle is upstream of an inlet of the LP-EGR passage into the engine intake.

* * * * *